(12) United States Patent
Yamakawa et al.

(10) Patent No.: US 8,732,443 B2
(45) Date of Patent: May 20, 2014

(54) PROGRAM PROCESSING DEVICE AND PROGRAM PROCESSING METHOD WHICH IS ABLE TO CONTROL WRITING INTO AN INTERNAL MEMORY

(75) Inventors: Naoya Yamakawa, Gifu (JP); Yasunori Nagata, Gifu (JP); Tomofumi Watanabe, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 531 days.

(21) Appl. No.: 11/935,659

(22) Filed: Nov. 6, 2007

(65) Prior Publication Data

US 2008/0109633 A1 May 8, 2008

(30) Foreign Application Priority Data

Nov. 6, 2006 (JP) .................................. 2006-300731

(51) Int. Cl.
*G06F 9/445* (2006.01)
(52) U.S. Cl.
USPC .......................................................... 712/227
(58) Field of Classification Search
CPC ................................ G06F 9/4401; G06F 9/445
USPC .......................................................... 712/227
See application file for complete search history.

(56) References Cited

U.S. PATENT DOCUMENTS

| 5,699,504 | A | 12/1997 | Mano |
| 6,317,706 | B1 * | 11/2001 | Saib ................................ 703/27 |
| 6,453,435 | B1 * | 9/2002 | Limon, Jr. et al. ............ 714/724 |
| 6,820,192 | B2 * | 11/2004 | Cho et al. ....................... 712/227 |
| 7,149,888 | B1 * | 12/2006 | Hart et al. .......................... 713/2 |
| 7,203,819 | B2 | 4/2007 | Suzuki et al. |
| 7,363,481 | B2 | 4/2008 | Sugimori |
| 7,401,163 | B2 | 7/2008 | Nishimoto et al. |
| 7,434,103 | B2 * | 10/2008 | Suzuki et al. .................... 714/38 |
| 2001/0004766 | A1 * | 6/2001 | Koyama ............................ 717/4 |
| 2002/0013633 | A1 | 1/2002 | Kodama |
| 2002/0166075 | A1 * | 11/2002 | Agarwal et al. ............... 713/320 |
| 2003/0023955 | A1 * | 1/2003 | Bates et al. .................... 717/129 |
| 2005/0044452 | A1 | 2/2005 | Suzuki et al. |
| 2007/0226473 | A1 * | 9/2007 | Kapustin et al. .............. 712/227 |

FOREIGN PATENT DOCUMENTS

| CN | 1584852 A | 2/2005 |
| JP | 7-334476 A | 12/1995 |
| JP | 8-106399 A | 4/1996 |
| JP | 11-265303 A | 9/1999 |

(Continued)

OTHER PUBLICATIONS

Aspinall et al. "The Microprocessor and its Application". 1978, pp. 51-52.*
"Chapter 5: Direct Memory Access". 6 pages. Jun. 24, 1997.*
Notification of Grant of Rights for Invention Patent for Chinese Patent Application 200710184821.5 issued Dec. 25, 2009 with English translation.

(Continued)

*Primary Examiner* — Robert Fennema
(74) *Attorney, Agent, or Firm* — Polansky & Associates, P.L.L.C.; Paul J. Polansky

(57) ABSTRACT

A program processing device comprises a CPU for carrying out predetermined processing according to a program; an internal memory storing the program and data generated by the CPU by carrying out the program, and a data acquiring circuit connected to an external program processing device, for acquiring the program from the external program processing device to write into the internal memory, wherein the CPU, the internal memory, a debug processing circuit, and the data acquiring circuit are integrally mounted on the same semiconductor substrate.

20 Claims, 4 Drawing Sheets

(56) References Cited

FOREIGN PATENT DOCUMENTS

| | | |
|---|---|---|
| JP | 2002-41285 A | 2/2002 |
| JP | 2002-108646 A | 4/2002 |
| JP | 2004-78604 A | 3/2004 |
| JP | 2004-164113 A | 6/2004 |
| JP | 2005-70949 A | 3/2005 |
| JP | 2005-70950 A | 3/2005 |
| JP | 2005-122759 A | 5/2005 |
| JP | 2005-352591 A | 12/2005 |
| JP | 2006-202200 A | 8/2006 |
| KR | 10-2005-0021241 A | 3/2005 |

OTHER PUBLICATIONS

Notice of Grounds for Rejection for Patent Application No. JP2006-300731 mailed Nov. 10, 2009 with English translation.
Decision of Rejection for Patent Application No. 2006-300731 mailed Feb. 2, 2010 with English translation.
Chinese Office Action for Application No. 200710184821.5 issued Mar. 20, 2009 with English translation.
Chinese Office Action for Application No. 200710184821.5 issued Sep. 18, 2009 with English translation.
Notice of Grounds for Rejection for Korean Patent Application No. 10-2007-112120 mailed Feb. 23, 2010 with English translation.

* cited by examiner

PROGRAM PROCESSING DEVICE AND PROGRAM PROCESSING METHOD WHICH IS ABLE TO CONTROL WRITING INTO AN INTERNAL MEMORY

CROSS-REFERENCE TO RELATED APPLICATION(S)

The entire disclosure of Japanese Patent Application No. 2006-300731 filed on Nov. 6, 2006 including specification, claims, drawings and abstract is incorporated herein by reference.

BACKGROUND OF THE INVENTION

1. Field of the Invention

The present invention relates to a program processing device and a program processing method for preferably acquiring a program such as a firmware or the like from an external program processing device and carrying out predetermined signal processing.

2. Description of the Related Art

In recent years, an LSI having a CPU and a signal processing circuit both mounted on the same chip is used. For example, in an LSI having a chip having a CPU and a signal processing circuit for signal processing such as sound signal decoding, both mounted thereon, the CPU controls the operations of the signal processing circuit and other peripheral circuit (for example, an interface circuit or the like) and also carries out processing other than the processing carried out by the signal processing circuit, according to a program.

FIG. 4 shows a structure of a conventional program processing device 300. The program processing device 300 comprises a CPU 302 for carrying out predetermined processing according to a program and an internal RAM 308 for storing the data generated by the CPU 302. The program processing device 300 is connected to a program memory 318 via an input/output interface 316, the program memory 318 storing a program to be carried out by the CPU 302. The program processing device 300 additionally comprises a debug processing circuit 310 for monitoring at least one variable contained in a program and carrying out predetermined processing according to the result obtained in the monitoring, and a debug interface 312 for sending a result of the processing carried out by the debug processing circuit 310 to a personal computer 200 which contains a debug tool 210.

After initialization of the CPU 302, a program is read from the program memory 318 via an external bus 320 and the input/output interface 316, and the CPU 302 carries out predetermined signal processing according to the program. The internal RAM 308 stores intermediate data or the like generated during the execution of the program. While the program processing device 300 includes a signal processing circuit (not shown), the CPU 302 controls the operation of the signal processing circuit according to the program.

An LSI having a signal processing circuit and a CPU integrally mounted on a single chip has a problem of low efficiency in verifying (debugging) a program in a development stage as the CPU bus and a controller are intensively accommodated inside the chip. In order to address the above, the program processing device 300 comprises a debug processing circuit 310 and a debug interface 312.

In debugging, the debug processing circuit 310 carries out a process, including initialization, suspension of the ongoing execution of a program on hold, and resuming of a program on hold, relative to the program processing device 300, based on an instruction from the debug tool 210. Also, the debug processing circuit 310 stores a variable of the program in a register (not shown) of the debug processing circuit and monitors the variable by monitoring the internal bus 322. The debug processing circuit carries out predetermined processing according to the result obtained through the monitoring. The result obtained in the processing carried out by the debug processing circuit 310 is sent via the debug interface 312 and a debug communication line 220 to a personal computer 200. The developer of a program can check the result obtained by monitoring the variable, using the personal computer 200 which contains the debug tool 210, to verify the program.

The conventional program processing device 300 obtains a program from the program memory 318 connected thereto, and carries out predetermined signal processing. However, system diversification brings about the need for signal processing according to a program obtained from other than the program memory 318, though a conventional program processing device 300 connected to a program processing device other than the program memory 318 cannot carry out signal processing according to a program obtained from the program processing device connected.

SUMMARY OF THE INVENTION

According to the present invention, there is provided a program processing device, comprising a CPU for carrying out predetermined processing according to a program; an internal memory storing the program and data generated by the CPU by carrying out the program, and a data acquiring circuit connected to an external program processing device, for acquiring the program from the external program processing device to write into the inner memory, wherein the CPU, the internal memory, a debug processing circuit, and the data acquiring circuit are integrally mounted on the same semiconductor substrate.

BRIEF DESCRIPTION OF THE DRAWINGS

An exemplary embodiment of the present invention will be described in detail based on the following figures, wherein.

DESCRIPTION OF THE PREFERRED EMBODIMENT

Figure 1:
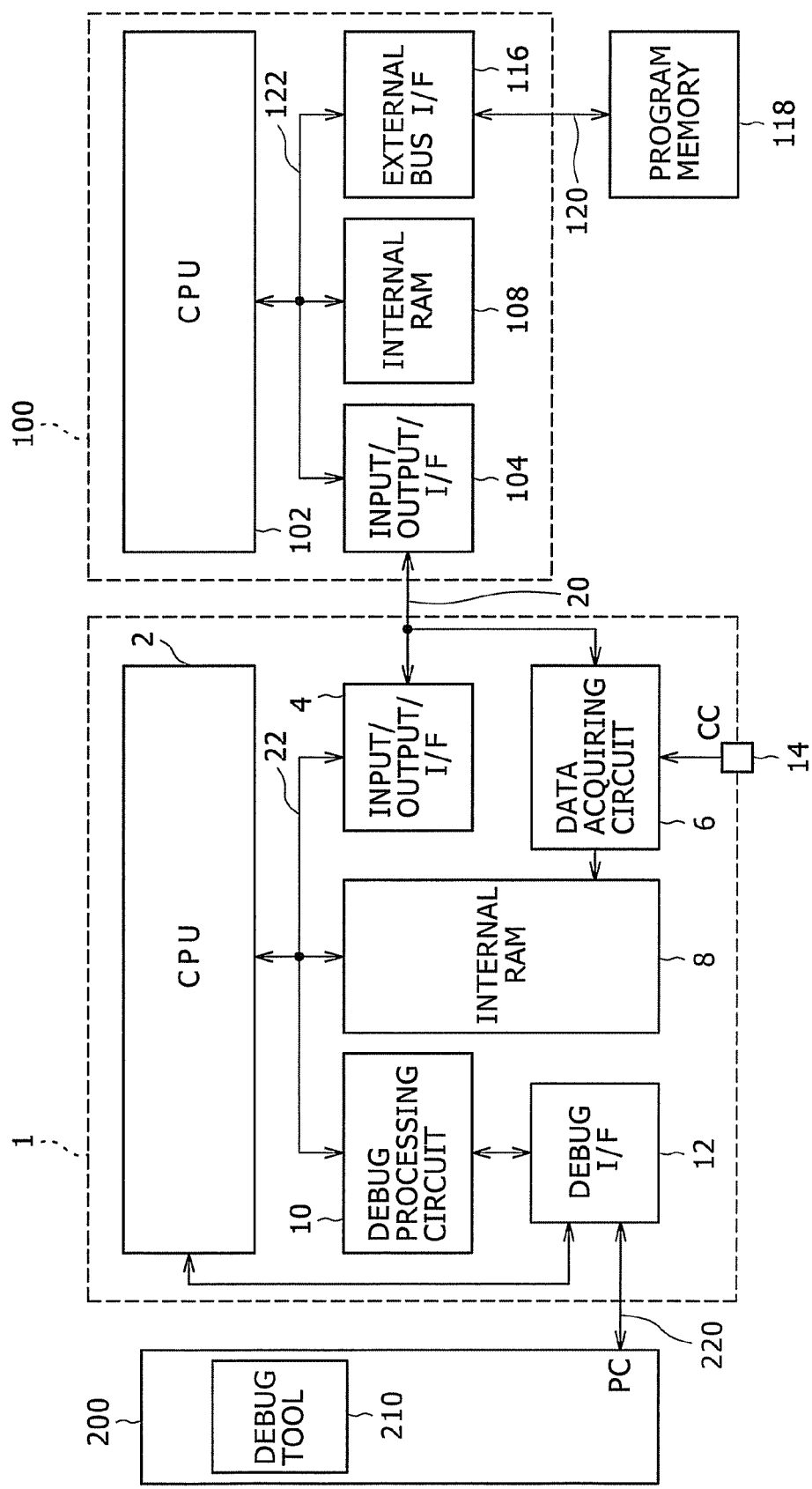
FIG. 1 is a diagram showing a structure of a program processing device according to an embodiment of the present invention.

FIG. 1 shows a program processing device according to an embodiment of the present invention. The first program processing device 1 comprises a first CPU 2, a first input/output interface 4, a data acquiring circuit 6, a first internal RAM 8, a debug processing circuit 10, a debug interface 12, and a control terminal 14. The first program processing device 1 additionally comprises a signal processing circuit (not shown). These elements are integrally mounted on the same semiconductor substrate. The first program processing device 1 is connected via a data transmission line 20 to a second program processing device 100.

The first CPU 2 obtains a program and carries out predetermined signal processing. The first CPU 2 also controls, according to the program, the first input/output interface circuit 4, the first internal RAM 8, the debug processing circuit 10, the debug interface 12, the signal processing circuit (not shown), all mounted on the same semiconductor substrate.

The first input/output interface 4 carries out data transmission with respect to a second input/output interface 104 included in the second program processing device 100 according to a predetermined data transfer mode. Specifically, the first input/output interface 4 sends a result of processing by the first CPU 2 to the second program processing device 100 via the second input/output interface 104, and sends the data received from the second program processing device 100 to the first CPU 2 or the first internal RAM 8 via the first internal bus 22.

The data acquiring circuit 6 receives the program sent from the second input/output interface 104 via the data transmission line 20 and writes into the first internal RAM 8. Preferably, the data acquiring circuit 6 receives data from the second input/output interface 104 using the same data transfer mode as that of the first input/output interface 4. The data acquiring circuit 6 writes the program into the first internal RAM 8 without using the first internal bus 22.

The control terminal 14 is connected to the data acquiring circuit 6. The control terminal 14 selectively receives a voltage of 0V or 3V. The voltage applied to the control terminal 14 is sent as a control signal CC to the data acquiring circuit 6, so that the data acquiring circuit 6 operates according to the received control signal CC. For example, with a voltage 0V applied to the control terminal 14, the data acquiring circuit 6 is activated, and with a voltage 3V applied, the data acquiring circuit 6 is deactivated.

The first internal RAM 8 stores the program sent from the data acquiring circuit 6 and temporarily stores the data generated in the predetermined signal processing carried out by the first CPU 2. The first internal RAM 8 is preferably formed using an SRAM. With the first internal RAM 8 mounted on the semiconductor substrate where the first CPU 2 is mounted, increase in size of the first program processing device 1 can be suppressed.

According to an instruction from the debug tool 210, the debug processing circuit 10 carries out a process, including initialization, suspension of the ongoing execution of processing, or resuming of the processing on hold, for the program processing device 1. In addition, the debug processing circuit 10 monitors the first internal bus 22 to monitor a variable contained in a program written in the first internal RAM 8, and carries out processing in either the first or second mode according to the result obtained in the monitoring. For example, in the first mode, the debug processing circuit 10 monitors a variable contained in the program, then writes the result obtained in the monitoring into a register (not shown), and sends the data written in the register to the debug interface 12. In the second mode, the debug processing circuit 10 monitors a variable contained in the program, then temporarily suspends the ongoing execution of the program according to the result obtained in the monitoring, and notifies the debug interface 12 of the temporal suspension. The variable to be monitored in the first or second mode can be designated using a register (not shown) contained in the debug processing circuit 10. The number of variables which can be monitored during execution of a program can be changed according to the number of registers provided in the debug processing circuit 10.

The debug interface 12 sends the data transmitted via the debug communication line 220 from the debug processing circuit 10 to the personal computer 200. In addition, the debug interface 12 receives the data transmitted via the debug communication line 220 from the personal computer 200 and writes into the first internal RAM 8. The debug communication line 220 preferably comprises a small number of signal lines, for example, two signal lines, because provision of a larger number of input/output terminals for the debug interface 12 connected to the debug communication line 220 is not preferable as such a terminal will be no use after shipment of the product.

The personal computer 200 comprises a debug tool 210. The personal computer 200 processes the data received via the debug interface 12 and sends the data generated using the debug tool 210 to the debug interface 12. The program developer can check the result of the processing carried out by the debug processing circuit 10, using the personal computer 200, to thereby verify the program, and also writes the improved or modified program into the first internal RAM 8 via the debug interface 12.

The program memory 118 is connected to an external bus interface contained in the second program processing device to be described later. The program memory 118 stores a program to be carried out by the first CPU 2 and a program to be carried out by the second CPU. The first CPU 2 obtains the program via the second program processing device and the data acquiring circuit 6, and carries out predetermined signal processing.

The second program processing device 100 comprises a second CPU 102, a second input/output interface 104, a second internal RAM 108, and an external bus, interface 116. These elements are mounted to the semiconductor substrate.

The second CPU 102 carries out predetermined signal processing according to the acquired program and according to the program controls the operations of the second input/output interface circuit 104, the second internal RAM 108, and the external bus interface 116, all mounted on the same semiconductor substrate.

The second input/output interface 104 exchanges data with the first input/output interface 4 or the data acquiring circuit 6 according to a predetermined data transfer mode. The second input/output interface circuit 104 sends the result of the processing carried out by the second CPU 102 to the first program processing device 1 via the first input/output interface 4, and sends the data received from the first program processing device 1 to the second CPU 102 or the second internal RAM 108 via the second internal bus 122.

The second internal RAM 108 temporarily stores the data generated in the predetermined signal processing carried out by the second CPU 102. The second internal RAM 108 is preferably formed using an SRAM. Mounting the second internal RAM 108 onto the semiconductor substrate where the second CPU 102 is mounted can suppress an increase in size of the second program processing device 100.

The external bus interface 116 is connected to the program memory 118 via the external bus 120. The second CPU 102 obtains a program from the program memory 118 via the external bus 120 and the external bus interface 116, and carries out predetermined signal processing.

In the following, an operation of the program processing device will be described with reference to FIGS. 2 and 3.

Figure 2:
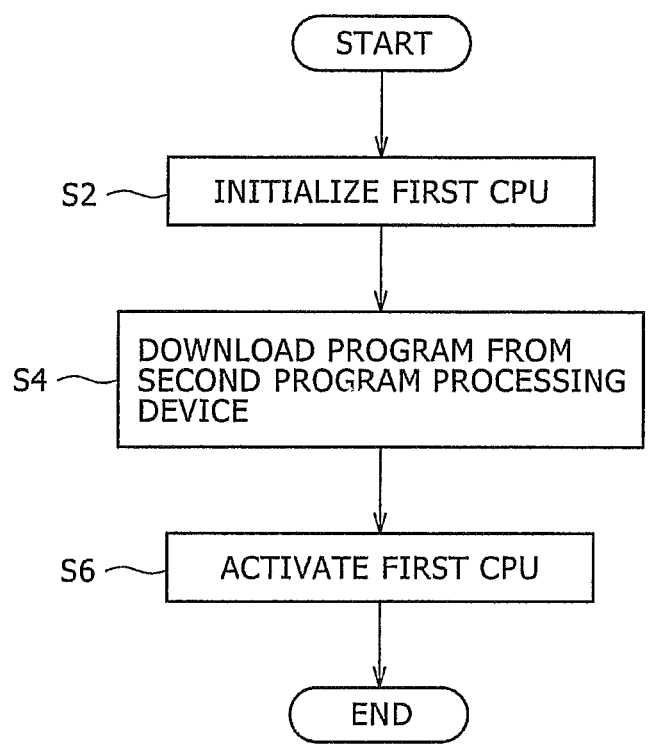
FIG. 2 is a flowchart of program processing according to the embodiment of the present invention.

FIG. 2 shows a normal operation of the program processing device, in which the control terminal 14 is fixed at 0V. That is, the data acquiring circuit 6 remains active.

In step S2, the first CPU 2 is initialized, in which all signal processes having been carried out thus far by the first CPU 2 are abandoned and preparation to begin signal processing according to a program is made.

In step S4, the data acquiring circuit 6 obtains a program from the second program processing device 100 and writes into the first internal RAM 8. The program written into the first internal RAM 8 is the one stored in the program memory 118 connected to the second program processing device 100. The data acquiring circuit 6 acquires the program via the external bus 120, the external bus interface 116, the second internal bus 122, the second input/output interface 104, and the data transmission line 20. In the above, as the first CPU 2 remains inactive, the first input/output interface 4, the debug processing circuit 10, the debug interface 12, and the signal processing circuit (not shown), all under control of the first CPU 2, remain inactive.

In step S6, the first CPU 2 is activated, and carries out predetermined signal processing according to the program stored in the first internal RAM 8. Accordingly, the first input/output interface 4, the debug processing circuit 10, the debug interface 12, and the signal processing circuit (not shown) are activated according to the signal processing carried out by the first CPU 2.

It should be noted that the operation of the program processing device shown in FIG. 2 is preferably applied after a developed finished program stored in the program memory 118 is provided to a user. That is, the operation is preferably carried out in a case where the first program processing device 1 of a product having the first program processing device 1 and the first program processing device 1 mounted therein is always required to acquire and activate the program stored in the program memory 118.

Figure 3:
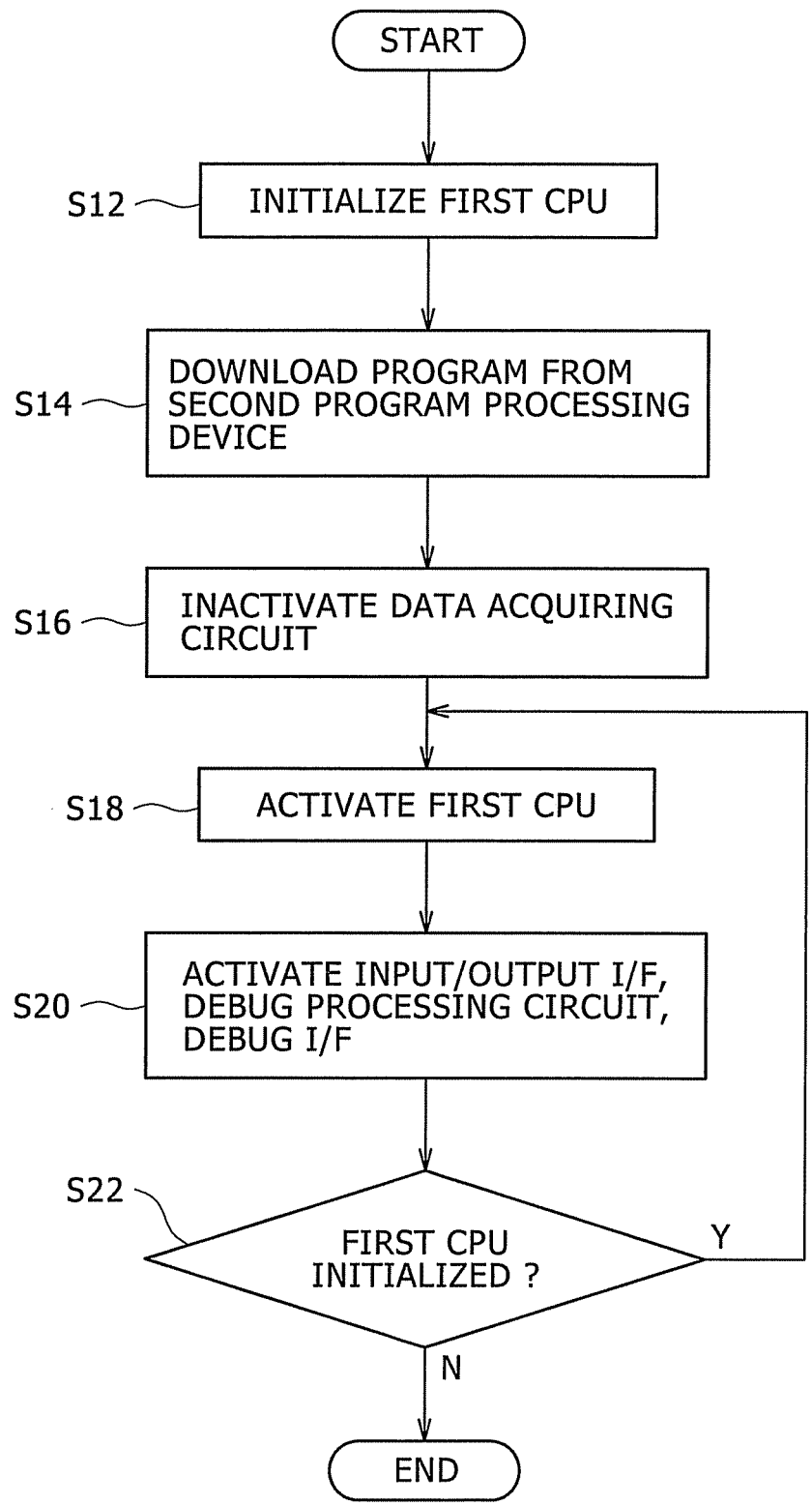
FIG. 3 is a flowchart of program processing according to the embodiment of the present invention.
Figure 4:
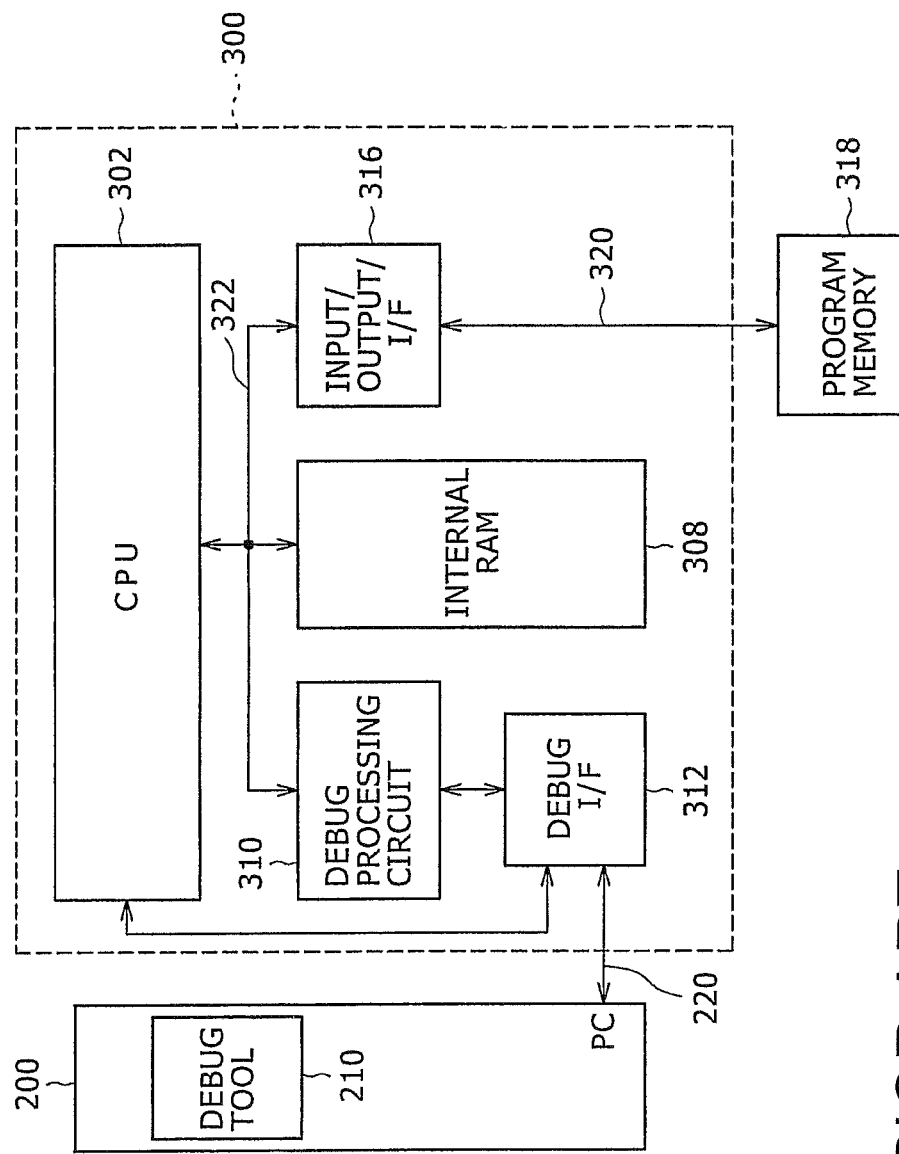
FIG. 4 is a diagram showing a structure of a program processing device according to related art.

FIG. 3 shows an operation of the program processing device carrying out debug processing, in which the control terminal 14 begins operating with a voltage 0V. That is, the data acquiring circuit 6 in an activated state begins operating.

Specifically, in step S12, the first CPU 2 is initialized, which involves abandoning all of the signal processes having been carried out thus far by the first CPU 2, and preparation to begin signal processing based on a program is carried out.

In step S14, the data acquiring circuit 6 acquires a program from the second program processing device 100 and writes into the first internal RAM 8. The program written in the first internal RAM 8 is the one stored in the program memory 18 connected to the second program processing device 100. The data acquiring circuit 6 acquires the program via the external bus 120, the external bus interface 116, the second internal bus 122, the second input/output interface 104, and the data transmission line 20. In the above, as the first CPU 2 remains inactive, the first input/output interface 4, the debug processing circuit 10, the debug interface 12, and the signal processing circuit (not shown), all under control of the first CPU 2, remain inactive.

In step S16, the voltage to be applied to the control terminal 14 is switched from 0V to 3V. That is, after the program is stored in the first internal RAM 8, the data acquiring circuit 6 is deactivated.

In step S18, the first CPU 2 is activated, and then carries out predetermined signal processing based on the program stored in the first internal RAM 8.

In step S20, the first input/output interface 4, the debug processing circuit 10, the debug interface 12, and the signal processing circuit (not shown) are activated according to the signal processing carried out by the first CPU 2. With the above, the program developer can check the result of the processing carried out by the debug processing circuit 10, using the personal computer 200, to verify the program, and also write the improved or modified program into the first internal RAM 8 via the debug interface 12.

In step S22, it is determined whether or not the first CPU 2 needs to be initialized. Here, initialization is applied when, after a bug is found with a program and a program to modify the bug is written into the internal RAM 8, the modified program is carried out for verification. When it is determined that initialization is unnecessary, the first CPU 2 continues the predetermined signal processing. When it is determined, on the other hand, that initialization is necessary, initialization is applied before shifting to step S18 to activate the first CPU 2. In the above, no program is acquired from the program memory 118 as the data acquiring circuit 6 remains inactive in step S16, differing from step S12. The first CPU 2 begins predetermined signal processing based on the program already stored in the first internal RAM 8.

The operation of the program processing device as shown in FIG. 3 is preferably applied when debug processing is carried out for to a program under development. In debugging, initialization of the first CPU 2 and execution of the target program may be repetitively carried out in order to detect a bug with the program. Should the data acquiring circuit 6 remain active in the above, the data acquiring circuit 6 attempts to acquire a program from the program memory 118. Consequently, execution of the target program is withheld until completion of the program acquisition, with a longer period of time consequently elapsing before program execution begins, which deteriorates the debug efficiency. According to the program processing device shown in FIG. 3, on the other hand, the program acquiring operation can be skipped due to the data acquiring circuit 6 remaining inactive after step S14, which can realize efficient debug processing.

In addition, should the data acquiring circuit 6 remain active during a process of finding a bug with a program under development, using the debug processing circuit 10, writing a program to modify the bug via the debug interface 12 into the internal RAM 8, and carrying out the modified program again to be verified, the data acquiring circuit 6 attempts to acquire a program from the program memory 118. Consequently, the correction program stored in the first internal RAM 8 is overwritten by the program before the correction stored in the program memory 118. According to the program processing device shown in FIG. 3, on the other hand, the program acquiring operation can be skipped due to the data acquiring circuit 6 remaining inactive after step S14, which can prevent overwriting of the program in the first internal RAM 8.

In an embodiment of the present invention, the first program processing device 1, having the data acquiring circuit 6, can obtain a program necessary for the first CPU 2 from the second program processing device 100. This makes it possible to share the program memory 118 connected to the second program processing device 100, eliminating the need to provide a separate program storage memory in the first program processing device 1. This can realize a smaller system with relevant costs suppressed.

Through control of activation and deactivation of the data acquiring circuit 6 according to a voltage applied to the control terminal 14, data acquisition from the program memory 118 can be controlled. Thus, program acquisition from the program memory 118 can be skipped in debugging, which enhances the debug efficiency.

Use of a data transmission mode by the data acquiring circuit 6 in receiving a program from the second input/output interface 104 according to the data transmission mode, which is the same as that of the first input/output interface 4, eliminates the need to provide a separate input/output terminal for use by the data acquiring circuit 6. This can suppress an increase in the number of input/output terminals provided to the first program processing device 1, which can suppress an increase in the chip size of the first program processing device.

With the debug interface 12 exchanging data via the debug communication line 220 which comprises, for example, two signal lines (serial), a debug interface 12 having a smaller number of input/output terminals can be realized. Where provision of a larger number of input/output terminals for the debug interface 12 is not preferable as such an input/output terminal will be of no use after shipment, provision of two input/output terminals is sufficient in the embodiment of the present invention. This contributes to suppressing an increase in the chip size of the first program processing device 1.

In the embodiment of the present invention, the control terminal 14 in the first program processing device 1 may be switched either automatically, based on a signal generated by the second program processing device 100, or based on a signal supplied from the outside.

It should be noted that preparation of two modes for the debug processing circuit 10, as described above in the embodiment of the present invention, is not an exclusive example, and that the number of modes may be defined as required. Also, the number of signal lines of the debug communication line 220 is not limited to two, as described in the above, and may be preferably defined in consideration of maintaining a balance between improvement of debug efficiency and an increase in the number of input/output terminals of the debug interface 12.

The second program processing device 100 connected to the first program processing device 1 in the embodiment of the present invention may be any program processing device containing the second CPU 10, including a program processing device having a built-in signal processing circuit (not shown), for example.

What is claimed is:

1. A first program processing device connected to a second program processing device provided externally to the first program processing device, comprising:
   a CPU structured to carry out predetermined processing according to a program;
   an internal memory structured to store the program and data generated by the CPU by carrying out the program, and
   a data acquiring circuit structured to acquire the program from a program memory to write into the internal memory before the CPU is activated;
   a control terminal connected to the data acquiring circuit structured to control whether or not to activate the data acquiring circuit based on a signal supplied from the outside of the first program processing device;
   a debug processing circuit structured to monitor at least one variable contained in the program to carry out a process in accordance with a result obtained in monitoring;
   wherein the signal provided from outside of the first program processing device is directly input to the data acquiring circuit without being input to the CPU;
   the data acquiring circuit is structured to write the program into the internal memory after the signal supplied from the outside is inputted in the control terminal and when the CPU is not yet executing any instructions;
   wherein the CPU is initialized and the program processing device activates the data acquiring circuit to load the program over a data transmission line and subsequently activates the initialized CPU in response to a first state of the control terminal, and subsequently initializes the CPU without activating the data acquiring circuit and activates the subsequently initialized CPU in response to a second state of the control terminal; and
   wherein the CPU, the internal memory, the data acquiring circuit, and the debug processing circuit are integrally mounted on a same semiconductor substrate.

2. The first program processing device according to claim 1, further comprising:
   an input/output interface connected to the second program processing device, structured to carry out data transmission for the second program processing device in a predetermined data transmission mode according to the program being carried out, wherein
   the data acquiring circuit is structured to acquire the program from the program memory in the same predetermined data transmission mode as that of the input/output interface.

3. The first program processing device according to claim 1, further comprising a debug interface connected to a debug tool for monitoring a result of processing carried out by the debug processing circuit, for exchanging serial data between the first program processing device and the debug tool.

4. A circuit forming a first program processing device comprising:
   a CPU structured to carry out predetermined processing according to a program;
   an internal memory structured to store the program and data generated by the CPU by carrying out the program;
   a debug processing circuit structured to monitor at least one variable contained in the program to carry out a process in accordance with a result obtained in monitoring;
   a data acquiring circuit having an input for receiving a control signal to selectively acquire the program from a data transmission line and to write the program into the internal memory; and
   wherein the CPU is initialized and the first program processing device activates the data acquiring circuit to load the program over the data transmission line and subsequently activates the initialized CPU in response to a first state of the control signal, and subsequently initializes the CPU without activating the data acquiring circuit and activates the subsequently initialized CPU in response to a second state of the control signal.

5. The circuit of claim 4 wherein:
   the first program processing device further comprises a control terminal for receiving the control signal.

6. The circuit of claim 5 wherein:
   the CPU, the internal memory, the debug processing circuit, the data acquiring circuit, and the control terminal are integrally mounted on a same semiconductor substrate.

7. The circuit of claim 4, further comprising:
   an input/output interface connected to the CPU and structured to be connected to the data transmission line.

8. The circuit of claim 7, wherein input/output interface and the data acquiring circuit are structured to communicate over the data transmission line using a predetermined data transmission mode.

9. The circuit of claim 4, wherein the CPU and the data acquiring circuit are separately connected to the internal memory.

10. The circuit of claim 4, wherein the internal memory is a RAM.

11. The circuit of claim 4, further comprising:
    a second program processing device connected to the data transmission line; and
    a program memory connected to the second program processing device,
    wherein the data acquiring circuit loads the program stored in the program memory from the second program processing device over the data transmission line.

12. The circuit of claim 4, further comprising:
a debug interface structured to exchange data between the debug processing circuit and a personal computer over a debug communication line.

13. The circuit of claim 12, wherein the personal computer contains a debug tool.

14. The circuit of claim 4, wherein the CPU and the debug processing circuit are connected to the internal memory using an internal bus.

15. A method for use in a first program processing device having a CPU and a debug processing circuit comprising:
initializing the CPU;
receiving a control signal;
in response to a first state of the control signal:
loading a program over a data transmission line;
storing the program in an internal memory; and
subsequently activating the initialized CPU;
subsequently initializing the CPU;
in response to a second state of the control signal:
activating the subsequently initialized CPU while skipping acquisition of the program over the data transmission line; and
carrying out predetermined processing by the CPU according to the program while monitoring at least one variable contained in the program using the debug processing circuit.

16. The method of claim 15 further comprising:
modifying the program in the internal memory using the debug processing circuit.

17. The method of claim 16 further comprising, after the modifying:
receiving the control signal in the second state;
initializing the CPU;
activating the CPU while skipping acquisition of the program over the data transmission line; and
carrying out predetermined processing by the CPU according to the program so modified.

18. The method of claim 15 wherein the receiving the control signal comprises:
receiving the control signal supplied from outside of the program processing device on a control terminal.

19. The method of claim 15 wherein the loading the program over the transmission line comprises:
loading a program from a second program processing device.

20. The method of claim 19 wherein the loading the program from the second program processing device comprises:
loading the program into the second program processing device from a program memory; and
providing the program so loaded to the first program processing device.

* * * * *